United States Patent [19]

Honig

[11] Patent Number: 4,501,173
[45] Date of Patent: Feb. 26, 1985

[54] FLUID DELIVERY CONTROL DEVICE FOR AN AUTOMATIC TRANSMISSION

[75] Inventor: Ernst-August Honig, Wolfsburg, Fed. Rep. of Germany

[73] Assignee: Volkswagenwerk Aktiengesellschaft, Wolfsburg, Fed. Rep. of Germany

[21] Appl. No.: 455,961

[22] Filed: Dec. 1, 1982

[30] Foreign Application Priority Data

Dec. 8, 1981 [DE] Fed. Rep. of Germany ....... 3148453

[51] Int. Cl.³ ............................................. B60K 41/06
[52] U.S. Cl. ........................................ 74/868; 74/867; 74/869
[58] Field of Search ................. 192/0.033, 0.076, 3.57, 192/103 R; 74/868, 869, 867, 861, 752 C

[56] References Cited

U.S. PATENT DOCUMENTS

| 3,800,627 | 4/1974 | Oberpichler | 74/752 C |
| 3,902,380 | 9/1975 | Murakami | 74/868 |
| 3,949,627 | 4/1976 | Murakami | 74/867 |
| 4,020,718 | 5/1977 | Miyauchi et al. | 74/869 |
| 4,046,033 | 9/1977 | Hashimoto et al. | 74/869 |
| 4,253,553 | 3/1981 | Yamada et al. | 74/869 X |
| 4,291,596 | 9/1981 | Sakakibara | 74/867 |
| 4,296,652 | 10/1981 | Oberpichler et al. | 74/868 |
| 4,331,045 | 5/1982 | Diech et al. | 192/0.076 X |

FOREIGN PATENT DOCUMENTS

| 1655559 | 10/1966 | Fed. Rep. of Germany . | |
| 2137160 | 2/1973 | Fed. Rep. of Germany . | |
| 2350649 | 4/1974 | Fed. Rep. of Germany | 74/868 |
| 2324189 | 11/1974 | Fed. Rep. of Germany . | |
| 2502347 | 7/1976 | Fed. Rep. of Germany . | |
| 1680650 | 9/1978 | Fed. Rep. of Germany | 74/868 |
| 2934921 | 3/1980 | Fed. Rep. of Germany . | |
| 54-109569 | 8/1979 | Japan | 74/867 |
| 56-55749 | 5/1981 | Japan | 74/869 |

Primary Examiner—Leslie A. Braun
Assistant Examiner—Arthur T. Quiray
Attorney, Agent, or Firm—Brumbaugh, Graves, Donohue & Raymond

[57] ABSTRACT

A control device for effecting variable hydraulic fluid delivery to a gearshift element of an automatic transmission and controlling actuation of the gearshift element. Such a control device includes a delivery line for supplying a pressurized fluid to the gearshift element, a throttle in the delivery line, a bypass line for bypassing the throttle and supplying the pressurized fluid to the gearshift element, and a valve arranged in the bypass line that has a piston that is moveable between an open position, which permits flow through the bypass line, and a closed position, which prevents flow. Pressure downstream of the throttle acts on the valve and urges the piston into the open position; a vehicle speed-dependent pressure acts on the valve and urges the piston into the closed position. The piston can be biased, for example, with a spring, such that the piston remains in the open position up to a predetermined vehicle speed. The vehicle speed-dependent pressure can act on an end face of the piston that has two surfaces, which are arranged in step form; this pressure acts on only one surface when the piston is in the open position and acts on both surfaces when the piston is in the closed position.

8 Claims, 3 Drawing Figures

FLUID DELIVERY CONTROL DEVICE FOR AN AUTOMATIC TRANSMISSION

BACKGROUND OF THE INVENTION

The present invention relates to a control device for effecting variable hydraulic fluid delivery to a gearshift element of an automatic transmission in an automobile, for controlling the actuation of the gearshift element.

Automatic transmissions are known which have a gearshift element, e.g. a so-called forward gear clutch, which connects positively the hydrodynamic torque converter turbine and the drive gears, when one of the forward gears is connected, and which is disconnected during certain vehicle operating conditions. By way of example, a hydraulic forward clutch element may be disengaged when the vehicle is coasting, by releasing the accelerator pedal, so as to disconnect the engine from the wheels. The engine can then idle (or may be stopped) during such operating states to conserve fuel. When it is desired to again drive the wheels with the engine, the vehicle operator depresses the accelerator pedal, and pressurized hydraulic fluid is provided to the gearshift element to re-connect the engine to the transmission and thereby to the driving wheels.

DE-OS No. 25 02 347 discloses a device for controlling the rate of delivery of hydraulic fluid to a gearshift element of an automatic transmission for actuating the same, in which the rate of delivery is controlled as a function of the pressure upstream from the gearshift element. The purpose of such a device is twofold: such a device permits engagement of the gearshift element as rapidly as possible and at the same time, engagement occurs with sufficient ease in order to avoid sudden shifting jolts, namely, those that would result from suddenly connecting an idling (or a stopped) engine to the rotating wheels of a moving vehicle. Such a control device includes a fluid delivery line with a throttle, a bypass line for bypassing the throttle, and a valve located in the bypass line for opening and closing the bypass line.

In operation, when pressurized fluid is initially supplied to the fluid delivery line, to re-connect the gearshift element, the fluid pressure upstream of the bypass valve is relatively high, and pressure downstream of the valve, i.e., at the gearshift element, is relatively low. This causes the bypass valve to open, so that initially pressurized fluid is delivered to the gearshift element through both the throttle line and the unrestricted bypass line, and pressure at the gearshift element builds up rapidly. The piston of the gearshift element moves very rapidly to a point where the element begins to engage because the bypass line is open. However, the increased fluid pressure on the downstream side of the bypass valve, which has caused the element to start to engage, also causes the bypass line to close before full clutch engagement occurs. Thereafter, pressurized fluid can flow to the gearshift element only through the throttle. Further pressure buildup, to complete the engagement of the element, occurs more slowly. A smooth engagement of the gearshift element is achieved due to the two stage engagement process, i.e., a rapid initial pressure build-up followed by a slower final pressure build-up in the element.

Control of the hydraulic fluid delivery solely by the pressure upstream from the gearshift element is insufficient to prevent sudden shifting jolts if the gearshift element is actuated while the vehicle is moving. Such actuation is required, for example, when operating the vehicle in the manner described above in order to obtain fuel savings during certain vehicle operating states (during coasting or engine-braking operations) and the gearshift element is disengaged while the vehicle is moving. After the particular vehicle operating state is terminated, it is necessary to re-engage the gearshift element, e.g. the forward clutch of the automatic transmission, in order to re-connect the driving engine and the driven wheels. However, as discussed above when the gearshift element is disengaged, the engine is normally idling. It is necessary then to connect an idling engine to moving engine wheels.

A sudden re-engagement of the gearshift element would effect a jump in engine rpm, since the engine and the wheels would be forced to turn at the same rate, taking into account the transmission ratio. Such re-engagement and engine acceleration can occur without any noticeable jolt at vehicle speeds up to about 60 to 80 kilometers per hour. However, at higher speeds, such re-engagement will cause the vehicle to lurch and produce an uncomfortable ride.

SUMMARY OF THE INVENTION

The present invention is a control device for controlling hydraulic fluid delivery to a gearshift element of an automatic transmission in an automobile for controlling actuation of the gearshift element.

More particularly, a control device in accordance with the invention has a throttle point arranged in a hydraulic fluid pressure admission line leading to the gearshift element and a bypass line, which line bypasses the throttle point to deliver pressurized fluid directly to the gearshift element. Opening and closing of the bypass line is controlled by a bypass valve, which includes a piston moveable between an open position, which permits flow through the bypass line, and a closed position, which prevents flow. The piston is acted on by the pressure upstream from the gearshift element (downstream from the throttle), which urges the piston toward the open position. In addition, a vehicle speed-dependent pressure acts on the piston, in opposition to the gearshift pressure signal, to urge the piston toward the closed position. Above predetermined vehicle speeds, the speed dependent pressure is sufficient to keep the bypass line closed, and to delay the engagement of the gearshift element for a period of time to permit the engine to reach the vehicle speed, e.g., during overrun or engine braking operations.

In a preferred embodiment, a spring is used to bias the piston into the open position such that the bypass line remains open, and pressurized fluid is delivered without restriction to re-engage the gearshift element, when the vehicle speed is less than predetermined value.

Preferably, the piston has two piston collars that, in association with the valve housing, define a chamber. Pressurized fluid from the throttled fluid delivery line is supplied to the chamber, and from the chamber to the gearshift element. The bypass line also opens into the chamber, and thereby communicates with the gearshift element, but can be selectively blocked by one of the piston collars.

In another preferred embodiment, the vehicle speed-dependent pressure acts on an end face of the piston that has two surfaces. This pressure acts on only one surface when the piston is in the open position and acts on both surfaces when the piston is in the closed position.

The position of the piston, i.e., to open or to block the bypass line, is controlled as described above as a function of the vehicle speed so that above a predetermined vehicle speed, the bypass line is blocked and hydraulic fluid delivery to the gearshift element occurs only through the line with the throttle point, and not also through the bypass line. When the bypass is closed, pressure on the gearshift element builds up slowly. As a result, at higher vehicle speeds the element does not engage immediately, but is delayed until the pressure downstream of the throttle increases enough to re-open the valve. The length of the delay is directly proportional to the vehicle speed: the higher the vehicle speed, the higher the vehicle speed-dependent pressure opposing re-opening of the bypass line, and thus the longer the delay.

During the time the bypass valve is closed, fluid delivery occurs through the throttled delivery line. This causes the fluid pressure downstream of the throttle to build up slowly. Eventually, the pressure on the gearshift element builds up to a value sufficient to overcome (together with the spring force on the piston) the vehicle speed-dependent pressure on the piston, and forces the piston open. This allows flow through the bypass line, and the gearshift element to engage. During this delay, the engine speed increases from idle speed to close to the vehicle speed. Consequently, there is little, if any, vehicle deceleration or jolting.

DETAILED DESCRIPTION OF THE PREFERRED EMBODIMENTS

Figure 1:
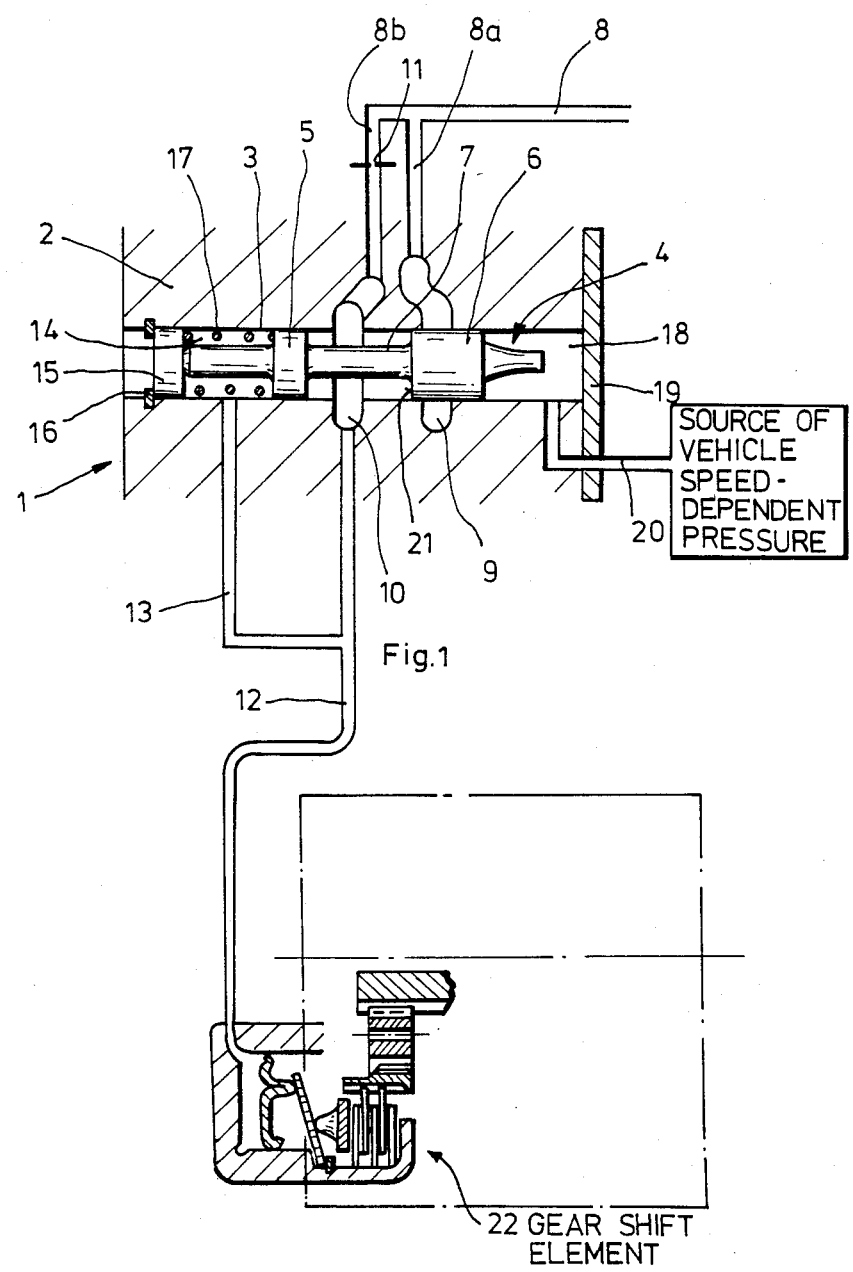
FIG. 1 is a schematic longitudinal cross-section of a control device in accordance with the invention for controlling actuation of a gearshift element.

FIG. 1 illustrates a control device in accordance with the invention. A control valve 1 has a piston 4 that slides in a bore 3 of a housing 2. The piston has two piston collars 5 and 6, defining an annular chamber 7 therebetween. In the housing bore 3, there are two annular hydraulic fluid connections 9 and 10 that are connected with a hydraulic fluid delivery line 8. The hydraulic fluid delivery line 8 supplies pressurized fluid for selective actuation of a gearshift element 22. In the hydraulic fluid delivery line 8 there are valves, not shown, that are actuated for engagement of the gearshift element, which occurs by fluid pressure being applied to the gearshift element through the fluid delivery line 8.

Valving arrangements are known in which pressurized fluid is delivered to a forward gear clutch of an automatic transmission through a valve. The valve is selectively controlled to either supply the pressurized fluid to the forward gear clutch, to engage the clutch, or to vent pressurized fluid from the clutch to cause the clutch to disengage. The valve is controlled by releasing or depressing the accelerator pedal, or by other vehicle operating parameters.

In one vehicle operating state, i.e., coasting or braking, the engine drag would slow the vehicle and waste fuel. Accordingly, when the accelerator pedal is released, pressurized fluid is vented from the forward clutch, and the engine is permitted to idle, uncoupled from the driving wheels. When it is again desired to connect the engine to drive the vehicle, the accelerator is depressed, causing pressurized fluid to be delivered to the line leading to the gearshift line.

A control in accordance with the present invention is interposed between such a pressurized fluid delivery system and the gearshift element, for controlling the delivery of the pressurized fluid to the element and thereby the reengagement of the gearshift element.

The housing connection 10 is arranged to open into the chamber defined by the piston collars 5 and 6 and the connecting portion 7 of the piston 4. The connection 10 is connected by a branch line 8b with the hydraulic fluid delivery line 8. The housing connection 10 is also connected to a pressurized fluid line 12, which leads to the gearshift element 22. With the housing connection 10 arranged and connected in this manner, there is a permanent fluid flow path between the hydraulic fluid delivery line 8 and the pressure line 12 through the throttle point 11 in the fluid flow path. The branch line 8b has the throttle point 11 in it. A bypass line 8a connects the hydraulic fluid delivery line 8 with the housing connection 9 and, as discussed below, can supply pressurized fluid directly to the gearshift element 22, bypassing the throttle 11. There is no throttle point in this bypass line.

The piston 4 of the valve 1 is loaded by a spring 17 arranged in a second chamber 14, defined by the end face of the piston collar 5 and plug 15. The spring 17 is maintained in the bore 3 by the plug 15 and a securing ring 16. The pressure upstream from the gearshift element is communicated to the chamber 14 by a fluid line 13 that branches off of line 12. This pressure acts on the end face of the piston collar 5.

A vehicle speed-dependent pressure acts on the end face of the piston collar 6. A source of vehicle speed-dependent fluid delivery pressure is communicated to a third chamber 18, lying between the end face of the piston collar 6 and cover 19, by a fluid delivery line 20. A vehicle speed-dependent pressure signal is used as a governing pressure in conventional gear controls. The cover 19 closes off the housing bore 3 and defines the third chamber.

The piston 4 of the control valve 1 is pushed toward the open position, to the right in FIG. 1, by the combined action of the pressure upstream from the gearshift element 22 (from line 13) and the spring 17. The piston is pushed toward the closed position, which is illustrated in FIG. 1, by the vehicle speed-dependent pressure signal. The speed-dependent pressure signal acts in opposition to both the spring and the pressure upstream from the gearshift element 22.

When the piston is in the open position, the housing connections 9 and 10 communicate with each other through the chamber defined between piston collars 5 and 6. With the piston in the open position, there is a direct, unthrottled connection between the hydraulic fluid delivery line 8, through the bypass line 8a, and the gearshift element 22. When the piston is in the closed position, as shown, the housing connections 9 and 10 do not communicate with each other because a control edge 21 of the piston collar 6 blocks the housing connection 9. With the piston in the closed position, the connection between the hydraulic fluid delivery line 8 and the gearshift element is only through the main fluid delivery line, 8b and 12, which is constricted by throttle point 11.

The spring 17 is dimensioned so that it biases the piston 4 in the open position until the vehicle speed reaches a predetermined value, for example, 60 to 80 kilometers per hour. When the vehicle speed is below the predetermined value, the pressure buildup at the gearshift element occurs without any delay, since there is a direct, unthrottled connection between the hydraulic fluid delivery line 8 and the gearshift element.

When the vehicle speed is above the predetermined value, the vehicle speed-dependent pressure signal is larger than the spring force of spring 17. As a result, when pressurized fluid in the gearshift element 22 and second chamber 14 are vented to cause the clutch element 22 to disengage, the vehicle speed-dependent pressure in the third chamber 18, which now acts in opposition only to the spring 17, pushes the piston 4 into the closed position.

When pressurized fluid is again provided to line 8, to re-engage the clutch 22, the branch line 8a is blocked by the control edge 21 of the piston collar 6. The only connection between the hydraulic fluid delivery line 8 and the gearshift element 22 is through the throttle element 11 in line 8b, and consequently, pressure on the gearshift element 22, to re-engage the forward clutch, builds up slowly.

As discussed above, normally the delivery of fluid to line 8 is effected by stepping on the accelerator. During the time engine rpm of the idling engine is increasing, the clutch of the moving vehicle remains disengaged. When the pressure on the gearshift element 22, which is also transmitted through line 13 to the second chamber 14, builds up to a sufficient value, this pressure and the spring 17 combine to force the piston 4 to the right in FIG. 1; into the open position, against the vehicle speed-dependent pressure signal in chamber 18. Opening of the bypass line 8a causes the clutch 22 to re-engage.

The delay in the opening of the valve 4 is proportional to the vehicle speed: the greater the vehicle speed, the higher the vehicle speed-dependent pressure signal, and the more the pressure on the gearshift element must build up in order to overcome the opposing pressure signal. Thus, the higher the vehicle speed, the longer the accelerating engine remains uncoupled from the gear train to reach traveling speed rpm.

At lower vehicle speeds, e.g., those below 60 to 80 kilometers per hour, a delay in the engagement of the gearshift element is unnecessary because the delay occuring during the normal clutch recoupling process is sufficient to permit the engine to come up to speed.

Figure 2:
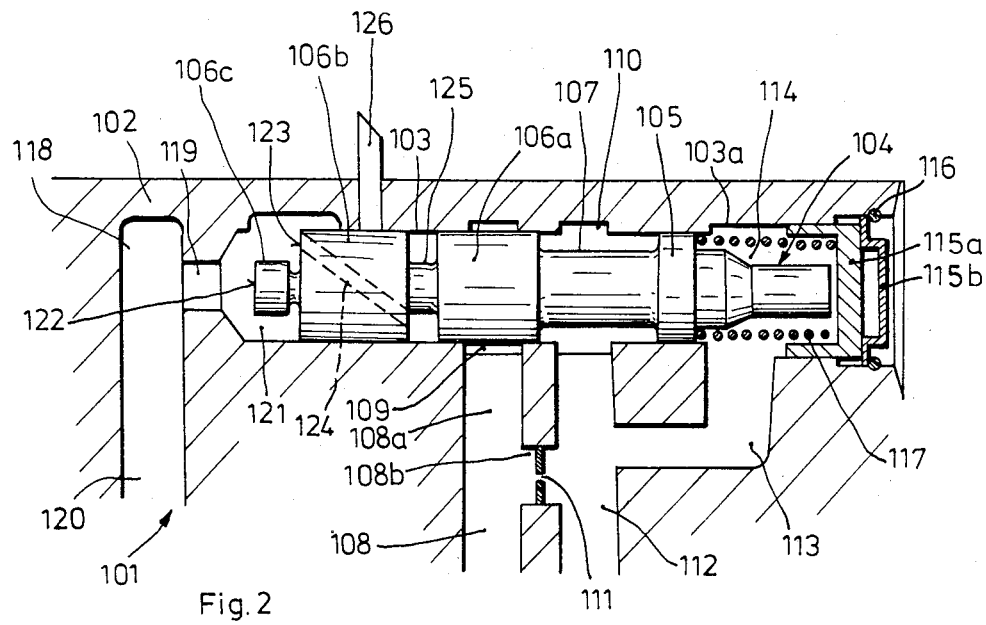
FIG. 2 is a schematic longitudinal cross-section of another control device in accordance with the invention.

FIG. 2 illustrates a variation, and in some measure an expanded embodiment, of the invention. In FIG. 2, elements which are comparable to elements in FIG. 1 are shown with reference numerals that are increased by 100 over the reference numerals used in FIG. 1. The control valve 101 has a piston 104 that slides in a bore 103 of a housing 102. The piston 104 has piston collars 105, 106a, 106b, and 106c. Arranged between the piston collars 105 and 106a is a connection portion 107 of the piston, and arranged between the piston collars 106a and 106b is a connection portion 125 of the piston. The housing bore 103 has two annular hydraulic fluid connections 109 and 110. The housing connection 109 is connected through a branch line 108a to a hydraulic fluid delivery line 108, which is connected by valves (not shown) to a source of main hydraulic pressure (not shown). The housing connection 110 is connected through pressurized fluid line 112 to a gearshift element (not shown). The line 112 is connected to the hydraulic fluid delivery line 108 through branch line 108b, which is provided with a throttle point 111 and through which hydraulic fluid can flow without flowing through the control valve 101.

The piston 104 of the control valve 101 is biased by a spring 117, which is shown on the right side in FIG. 2. The spring 117 pushes on a plug 115a, which is held in the housing bore 103 by a securing ring 116 and a cap 115b. The spring 117 is located in a chamber 114. The fluid pressure in the chamber 114 is the pressure building up ahead of the gearshift element, which pressure is delivered by means of a line 113 that branches off of the line 112 and acts on an end face of the piston collar 105 appearing on the right side of the collar in FIG. 2.

On the left end of the piston 104 in FIG. 2, a vehicle speed-dependent pressure acts on the piston 104. The vehicle speed-dependent pressure is connected to a chamber 118 by a line 120. The vehicle speed-dependent pressure acts on either a surface 122 or on surfaces 122 and 123, depending upon the position of the piston 104. The surface 122 is formed on the left end face of the piston collar 106c, and the surface 123, which has an annular shape, is formed on the left end face of the piston collar 106b. The surface 123 is associated with a pressure admission space 121, which is connected with the chamber 118 through a connecting bore 119. When the piston 104 is in the open position, i.e. is moved to the left in FIG. 2, the connection between the pressure admission space 121 and the chamber 118 is interrupted because the piston collar 106c plugs the bore 119. Also, when the piston is in the open position, the pressure admission space 121 is connected with a discharge line 126 through a bore 124 in the piston collar 106b and through a chamber defined by piston collar 106b, the connection portion 125, and piston collar 106a.

A control device in accordance with the invention as shown in FIG. 2 in which the amount of surface area acted upon by the vehicle speed-dependent pressure varies depending upon whether the piston is in the open or closed position, is advantageous in controlling clutch engagement, as described below.

Figure 3:
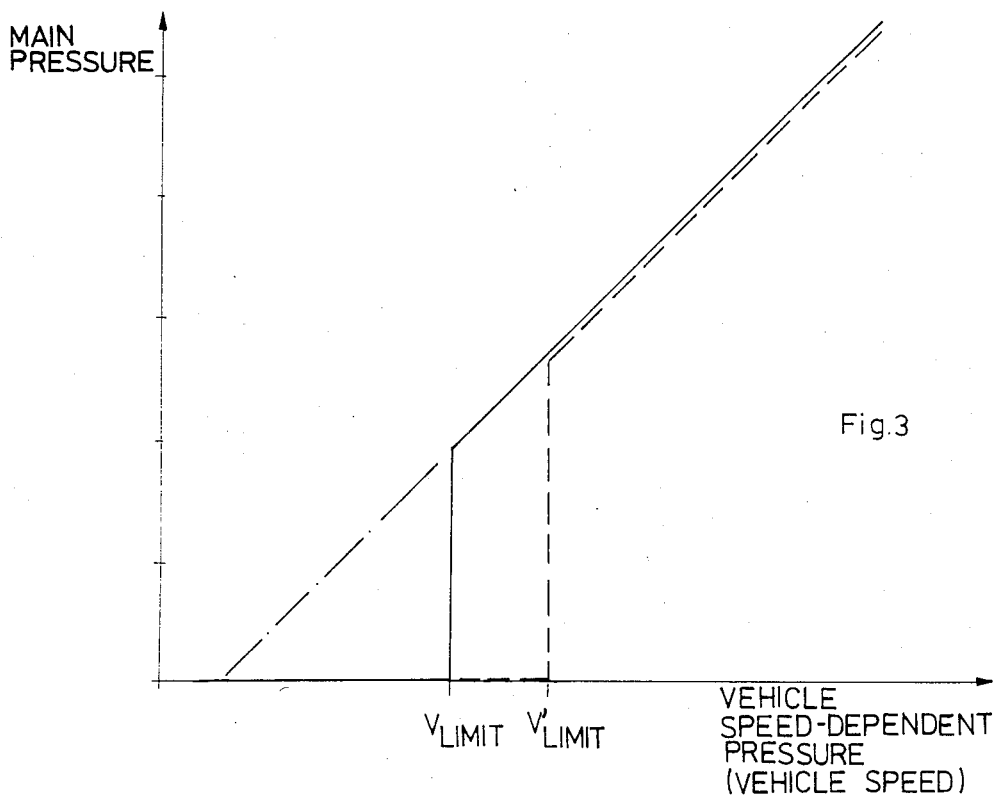
FIG. 3 is a diagram showing, for various vehicle speeds, the amount of main pressure needed to move the control devices of FIGS. 1 and 2 from the closed position to the open position.

The graph of FIG. 3 plots, in dependence of vehicle speed V, the amount of main pressure needed to be introduced into chamber 14 (FIG. 1) or 114 (FIG. 2) in order to move piston 4 or 104 into the open position. As discussed below, the solid line the dashed line illustrate the operating characteristics of two devices of the type shown in FIG. 2. The dash-dotted line illustrates the operation of the device shown in FIG. 1. The operation of one control device in accordance with FIG. 2 is shown by the solid line in FIG. 3. In the graph in FIG. 3, the main hydraulic fluid pressure building up ahead of the gearshift element is plotted on the vertical axis and the vehicle speed-dependent pressure is plotted on the horizontal axis. As shown, at vehicle speeds less than $V_{LIMIT}$, the piston 104 remains in the open position, i.e., it takes zero main pressure to keep piston 104 in the open position. This is due to the fact that the force of the spring 117, which urges the piston 104 of the control valve 101 to the left in FIG. 2, is greater than the force generated by the vehicle speed dependent pressure acting on the relatively small surface area 122. The piston collar 106c closes off the connecting line 119, the pressure admission space 121 is connected to the discharge line 126 through the bore 124, and thereby the vehicle speed-dependent pressure acts only on the smaller surface 122.

In the open position, the housing connections 109 and 110 are connected directly with each other through the chamber defined by the piston collar 106a, the connection portion 107, and the piston collar 105 so that the throttle point 111 is bypassed. Thus, at vehicle speeds below $V_{LIMIT}$, main pressure introduced into line 108 bypasses throttle point 111 and goes directly to the gearshift element, to re-engage the clutch without delay. The piston 104 remains in the open position independently from the magnitude of the pressure ahead of the gearshift element.

When the vehicle speed exceeds a predetermined limit speed, $V_{LIMIT}$, the vehicle speed-dependent pressure forces the piston 104 toward the closed position, which is shown in FIG. 2. After the piston 104 is slightly displaced from the fully open position, the vehicle speed-dependent pressure acts on surface 122 and surface 123 and urges the piston 104 toward the closed position. In the closed position, the pressure admission space 121 is connected to the chamber 118 by the bore 119 and the discharge line 126 is blocked by the piston collar 106b. Also, in the closed position, the connection between the housing connections 109 and 110 is blocked by the piston collar 106a, so that the hydraulic fluid delivery line 108 is connected with the line 112, which leads to the gearshift element, only by the branch line 108b, which has the throttle point 111 in it.

Accordingly, if the vehicle is traveling at speeds exceeding the predetermined limit speed, $V_{LIMIT}$, when pressurized fluid is introduced into line 108 to reconnect the gear shift element, the pressurized fluid must pass through throttle point 111 before reaching the gearshift element. The pressure on the gearshift element, and thereby in the chamber 114, builds up slowly until a pressure sufficiently large enough to force the piston into the open position, as indicated on the solid line in FIG. 2, is attained ahead of the gearshift element. Above $V_{LIMIT}$, the pressure required to force the piston back into the open position increases proportionally with the vehicle speed-dependent pressure, which accounts for the sloping section of the solid black line in FIG. 3.

The dashed line in FIG. 3 illustrate a control valve of the type shown in FIG. 2 which are engineered to have a different predetermined limit speed, $V'_{LIMIT}$. The limit $V_{LIMIT}$, at which the piston 104 moves from the open to the closed position, can be varied by varying the spring constant of the spring 117.

The characteristic step increase in the main pressure, which occurs at $V_{LIMIT}$, is due to the fact that once the predetermined limit speed is exceeded, the pressure admission space 121, which is associated with the surface 123, is connected with the chamber 118, and the vehicle speed dependent pressure suddenly acts on a considerably larger surface, i.e., the combination of surfaces 122 and 123, rather than only on surface 122, thereby greatly increasing the force on the piston urging it into the closed position.

The characteristic main pressure versus vehicle speed-dependent pressure line forms the boundary between two regions, namely, a region below the line where the piston is in the closed position so that, consequently, the gearshift element is supplied with hydraulic fluid from the hydraulic fluid delivery line via the throttle point 111, which results in a delay in the actuation of the gearshift element, and a region above the line where the piston is in the open position so that, consequently, the gearshift element is supplied with hydraulic fluid directly from the hydraulic fluid delivery line 108 through the housing connections 109 and 110, which are connected together, whereby the throttle point 111 is bypassed.

A characteristic operation of the embodiment of the invention in FIG. 1 is shown by the dotted and dashed line in FIG. 3; as illustrated, from 0 m.p.h. up to a certain vehicle speed V, as determined by the force of the spring 17, the piston 4 remains open, whereafter the force of the main pressure necessary to close the piston 4 increases proportional to the vehicle speed dependent pressure. However, since the vehicle speed dependent pressure always acts on the entire end surface of shoulder 6, (as opposed to acting on only a portion of the end face as in FIG. 2), the piston 4 closes at a lower vehicle speed than the piston 104 of FIG. 2, even though the surface area of the end surface of shoulder 106b (surfaces 122 and 123) is the same as the end surface of shoulder 6.

A control valve in accordance with FIG. 2 eliminates hydraulic fluid delivery delay, and delay in the actuation of the gearshift element, which occur at lower vehicle speeds in the FIG. 1 embodiment and, therefore, avoids the possibility of an unnecessary running-up of the engine speed, which could occur at lower vehicle speeds if there is an insufficient engagement of the gearshift element. Moreover, the FIG. 2 device can be constructed, by an appropriate choice of individual piston dimensions and spring constants, so that, above the limit speed, $V_{LIMIT}$, the main pressure versus vehicle speed-dependent pressure line is rendered as flat as desired, so that the control valve piston does not remain in the closed position, which is shown in FIG. 2, upon termination of shifting.

In other words, it is desirable that when the forward gear clutch is engaged, the main pressure delivered to the gearshift element is sufficient to overcome the vehicle speed-dependent pressure, is safely above the line in FIG. 3, so that, regardless of vehicle speed, the piston 4 or 104 moves to the open position and remains in the open position as the vehicle is running. If the piston were to remain in the closed position, and if the leakage occuring through the gearshift element is about the same as the flow of hydraulic fluid through the throttle point, then the full main pressure of hydraulic fluid delivery line 108 would not be attained on the gearshift element, and the gearshift element would be subjected to increased wear due to incomplete engagement. Thus, the control valves of FIGS. 1 and 2 are constructed so that the piston 4 or 104 does not remain in the closed position when the clutch is fully engaged.

A control device in accordance with the invention can be used in addition to other control devices. For example, in the present invention as illustrated in FIG. 1, engagement of the clutch 22 occurs, either initially or after a delay, with the bypass line 8a remaining open. It may be desirable to employ a device that effects a twostage delivery of hydraulic fluid delivery to the gearshift element such as that disclosed in DE-OS No. 25 02 347, or a device that controls delivery as a function of pressure upstream from the gearshift element and engine load-dependent pressure.

A control device in accordance with the invention can be used with other control devices since the present control device is used to effect a delay in engagement and other control devices serve to ensure a controlled pressure build-up in order to facilitate ease of engagement. These other control devices typically include a line with a throttle point and a bypass line, e.g., DE-OS No. 25 02 347, FIG. 1. In such a device, the bypass line is initially open to provide rapid fluid delivery to the clutch. When the clutch starts to catch, the bypass closes, and only a throttled connection is provided between the hydraulic fluid delivery line and the gearshift element. The remainder of the clutch engagement process proceeds slowly and smoothly, since the increase of pressure, which results from the delivery of fluid through the throttle point, occurs only gradually.

Such a device may be used in series with control device in accordance with the invention. In such a combined arrangement, the present invention would, under certain conditions, provide a delay before allowing fluid to flow unrestricted through the bypass. Once the device of the present invention starts such unrestricted delivery of the pressurized fluid through the bypass, the other device would function normally, e.g., to permit the unrestricted flow to continue until the onset of clutch engagement, and thereafter to restrict the rate of flow during the final clutch engagement process. If these control devices are used together, only one line with a throttle would be necessary and both devices would be connected in series in the bypass line.

The invention has been shown and described with reference to certain preferred embodiments thereof. Variations and modifications will be apparent to those skilled in the art without departing from the inventive principles disclosed herein. All such variations and modifications are intended to be within the scope of the invention as defined in the following claims.

I claim:

1. A control for effecting variable fluid delivery to a gearshift element of an automatic transmission, for controlling actuation of said gearshift element, comprising:
   fluid delivery means for supplying a pressurized fluid to said gearshift element, said delivery means having a throttle means arranged therein;
   bypass means, arranged to bypass said throttle means, for delivering said pressurized fluid to said gearshift element;
   a valve, arranged in said bypass means, having a piston moveable between an open position, for permitting flow through said bypass means, and closed position for blocking said flow;
   means communicating with said delivery means, downstream of said throttle means, for supplying a first pressure signal to said valve for acting on said piston, for urging said piston into said open position; and
   means for supplying a second, vehicle speed-dependent pressure signal to said valve for acting on said piston in opposition to said first pressure signal for urging said piston into said closed position.

2. A control according to claim 1 wherein said valve includes spring means for biasing said piston toward said open position, said spring means being arranged to maintain said piston in said open position at less than predetermined vehicle speeds.

3. A control according to claim 1:
   wherein said piston includes first and second piston collars defining a first chamber therebetween, and having end faces defining second and third chambers, respectively, on opposite sides of said first chamber;
   wherein said fluid delivery means includes a fluid delivery line communicating between said first chamber and said gearshift element;
   wherein the means for supplying said first and second pressure signals communicate, respectively, with said second and third chambers for acting on said end faces;
   wherein said bypass means includes a bypass delivery line arranged to deliver pressurized fluid, when said piston is in said open position, to said first chamber for delivery through said fluid delivery line; and
   wherein one of said piston collars includes a control edge arranged to selectively block delivery of fluid through said bypass delivery line to said first chamber.

4. A control as defined in claim 3, comprising a spring disposed in said second chamber for biasing said piston toward said open position.

5. A control device for effecting variable fluid delivery to a gearshift element of an automatic transmission, for controlling actuation of said gearshift element, comprising:
   fluid delivery means for supplying a pressurized fluid to said gearshift element, said delivery means having a throttle means arranged therein;
   bypass means, arranged to bypass said throttle means, for delivering said pressurized fluid to said gearshift element;
   a valve, arranged in said bypass means, having a piston movable between an open position, for permitting flow through said bypass means, and a closed position for blocking said flow;
   means communicating with said delivery means, downstream of said throttle means, for supplying a first pressure signal to said valve for acting on said piston, for urging said piston into said open position; and
   means for supplying a second, vehicle speed-dependent pressure signal to said valve for acting on said valve on said piston in opposition to said first pressure signal for urging said piston into said closed position;
   wherein said vehicle speed-dependent pressure acts on an end face of the piston that has a first surface and a second surface, said surfaces being arranged in step form such that said vehicle speed dependent pressure acts on said first surface when said piston is in both said open and closed positions, and acts on said second surface only when said piston is in said closed position.

6. A control device according to claim 5 wherein said second surface of said piston is associated with a pressure admission chamber, said pressure admission chamber communicating with said means for supplying a vehicle speed-dependent pressure signal when said piston is in said closed position and said pressure admission chamber communicating with a discharge line when said piston is in said open position.

7. A control device according to claim 6 wherein said pressure admission chamber is connected to said means for supplying a vehicle speed-dependent pressure signal by a connection line, said connection line being closed off by said first surface when said piston is in said open position.

8. A control device according to claim 6 wherein said pressure admission chamber is connected to said discharge line, when said piston is in said open position, by a bore arranged in said piston.

* * * * *

UNITED STATES PATENT AND TRADEMARK OFFICE
CERTIFICATE OF CORRECTION

PATENT NO. : 4,501,173

DATED : February 26, 1985

INVENTOR(S) : Ernst-August Honig

It is certified that error appears in the above-identified patent and that said Letters Patent is hereby corrected as shown below:

First page, Item [21], "455,961" should read --445,961--.

Signed and Sealed this

Ninth Day of August, 1988

Attest:

DONALD J. QUIGG

*Attesting Officer*   *Commissioner of Patents and Trademarks*